Figure 1:
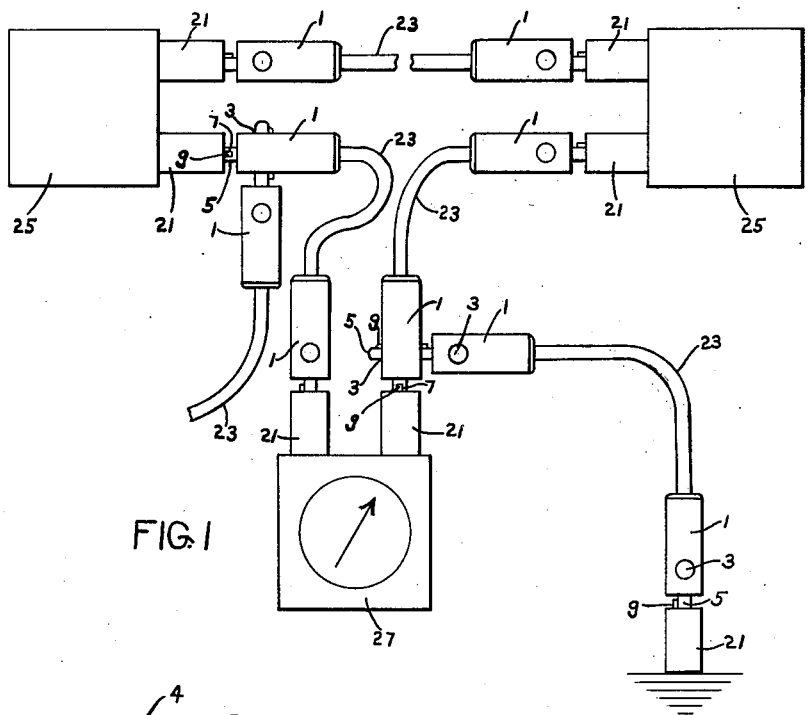

Sept. 17, 1957     L. R. DEMARKLES ET AL     2,807,001
ELECTRIC PLUG AND METHOD OF MANUFACTURING THE SAME
Filed Sept. 6, 1951     6 Sheets-Sheet 1

INVENTORS
LOUIS R. DEMARKLES
FRANK K. CHIN
NEWTON A. TEIXEIRA
BY

*Rines and Rines*

ATTORNEYS

Sept. 17, 1957    L. R. DEMARKLES ET AL    2,807,001
ELECTRIC PLUG AND METHOD OF MANUFACTURING THE SAME
Filed Sept. 6, 1951    6 Sheets-Sheet 3

INVENTORS
LOUIS R. DEMARKLES
FRANK K. CHIN
NEWTON A. TEIXEIRA
BY
Rines and Rines
ATTORNEYS Sept. 17, 1957  L. R. DEMARKLES ET AL  2,807,001
ELECTRIC PLUG AND METHOD OF MANUFACTURING THE SAME
Filed Sept. 6, 1951  6 Sheets-Sheet 4

INVENTORS
LOUIS R. DEMARKLES
FRANK K. CHIN
NEWTON A. TEIXEIRA
BY
Rines and Rines
ATTORNEYS Sept. 17, 1957 L. R. DEMARKLES ET AL 2,807,001
ELECTRIC PLUG AND METHOD OF MANUFACTURING THE SAME
Filed Sept. 6, 1951 6 Sheets-Sheet 5
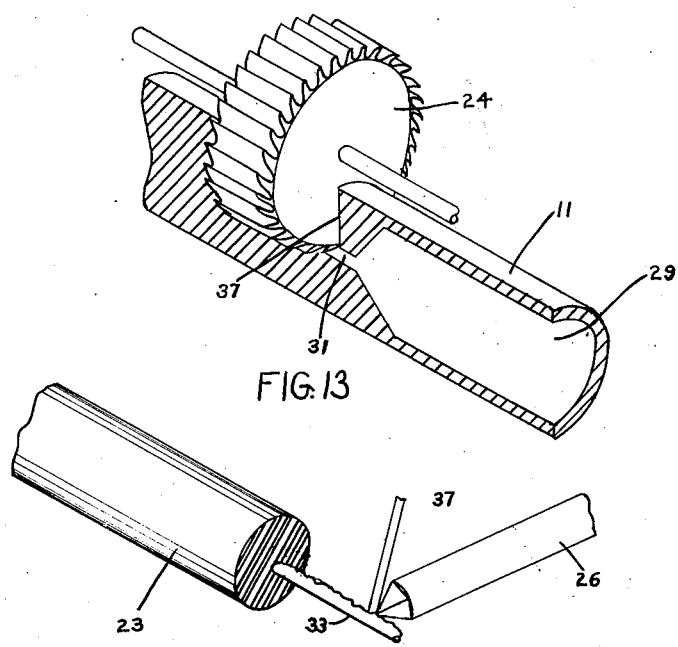
FIG. 13
FIG. 14
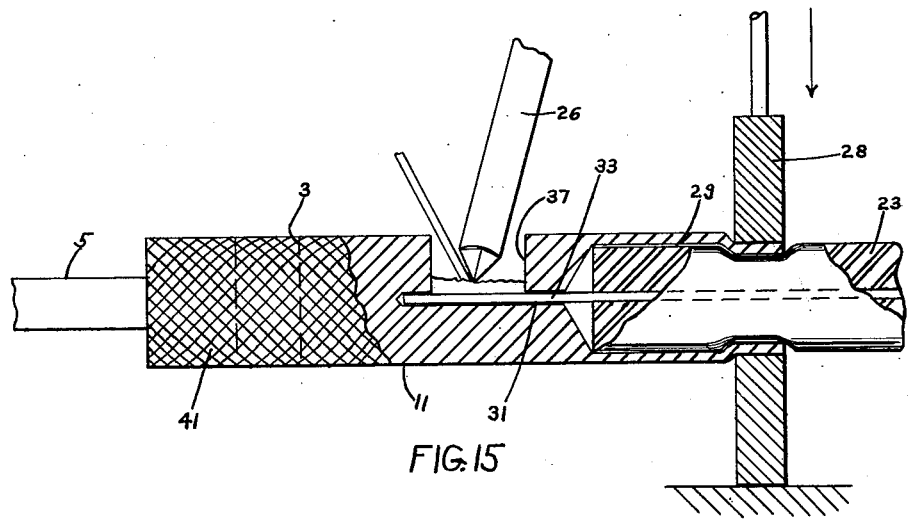
FIG. 15
INVENTORS
LOUIS R. DEMARKLES
FRANK K. CHIN
NEWTON A. TEIXEIRA
BY
Rines and Rines
ATTORNEYS Sept. 17, 1957     L. R. DEMARKLES ET AL     2,807,001
ELECTRIC PLUG AND METHOD OF MANUFACTURING THE SAME
Filed Sept. 6, 1951                          6 Sheets-Sheet 6

INVENTORS
LOUIS R. DEMARKLES
FRANK K. CHIN
NEWTON A. TEIXEIRA
BY Rines and Rines
ATTORNEYS United States Patent Office 2,807,001
Patented Sept. 17, 1957

2,807,001

ELECTRIC PLUG AND METHOD OF MANUFACTURING THE SAME

Louis R. Demarkles, Brighton, and Newton A. Teixeira and Frank K. Chin, Boston, Mass.

Application September 6, 1951, Serial No. 245,374

14 Claims. (Cl. 339—255)

The present invention relates to electric plugs for providing electrical connection with receptacles, such as sockets, associated with electrical apparatus.

In making electrical connections and measurements, it is frequently necessary to provide for rapidly connecting and disconnecting conductors to and from electrical apparatus without resorting to nuts, screws, solder or other permanent securing means, the use of which is awkward and time-consuming. To solve this problem, it has been proposed to use a receptacle, such as a socket, in the electrical apparatus into which a plug connected to a conductor may be inserted to establish electrical connection between the conductor and the electrical apparatus. In order that the plug may bear tightly in the socket, it is often formed of spring metal expanded in several places so as to make contact with the walls of the socket when the plug is forced therein. Such plugs are known in the art as "banana plugs." Their use, however, it attendant with serious disadvantages. Among these disadvantages is the fact that after continued use, the plugs lose their resiliency, and tight connections are no longer maintained in the socket. Not only does poor electrical contact result, but conducting surfaces carrying current may become exposed and, if contacted by the operator, may result in shocking him. These plugs, moreover, are secured to conductors, such as wire leads, through the medium of screws, solder-lug connections and similar devices. Flexing of the conductors, as occurs in electrical measurements and the like, frequently causes the conductors to break away from the "banana plug," or to make intermittent electrical contact therewith, or to expose the terminal portions of the current-carrying conductors, again inviting shock.

It has been proposed to obviate some of these difficulties by utilizing a plug having a hollow plug pin containing an element movably confined in the hollow provided with a contact member extending through a slot in the plug pin. The contact member is biased yieldingly outward through the slot toward a limiting position of outward movement, in order to bear against the walls of a socket when the plug pin is forced into the socket, thereby providing a rigid mechanical and electrical connection. Such plugs, while overcoming the disadvantages of "banana plugs" in connection with wear and reliable contact, are still subject to the other disadvantages above discussed. Wire conductors still break away from the plug since they are secured thereto in the same manner before described in connection with "banana plugs," and the danger of exposing current-carrying surfaces still exists. These plugs, moreover, provide but a single electrical connection and are without facility for enabling multiple electrical connections at the same point. They have heretofore been manufactured, furthermore, in a large number of different parts and pieces and in accordance with assembly techniques that have heretofore forbidden their commercial success.

An object of the present invention is to provide a plug of this character that is not subject to the disadvantage of breaking loose from the associated conductor or exposing conductor surfaces that may cause the shocking of the operator.

Still another object is to provide a plug that enables the effecting of multiple electrical connections.

A further object of the invention is to provide a method of manufacturing such a plug that minimizes the number of separate parts, that provides a construction and assembly technique adapted to mass-production requirements and that therefore permits the sale of the plug at a sufficiently low price to be commercial.

In summary, the invention embodies an electric plug having a preferably cylindrical insulation-covered conducting body portion provided with a transversely disposed plug-in-receiving recess for receiving the plug pin of a further plug, thereby permitting multiple electrical connections. Beyond the insulation covering there is provided a terminal conducting hollow plug pin the hollow of which communicates through a slot with an intermediately disposed portion of the exterior surface of the plug pin. An element provided with a contact member extending through the slot is movably confined in the plug-pin hollow, and spring means, disposed in the said hollow and engaging the element, biases the contact member yieldingly outward toward a limiting position of outward movement. A recess is provided at the other end of the conducting body having first and second portions of different cross-sectional dimensions, the second portion having a cross section sufficient to receive the stripped end of an insulation-covered wire-lead conductor and the first portion having a larger cross section for receiving the adjacent portion of the insulation of the insulation-covered conductor. The stripped end of the insulation-covered conductor is secured within the second recess portion and the said adjacent portion of the insulation is secured within the first recess portion, preferably by crimping the outer end of the conducting body portion of the plug. Preferrred molded plug-insulation coverings that minimize the possibility of separation of the plug from the wire-lead conductor and of exposing surfaces that might result in electrical shocking of the operator, and preferred manufacturing and assembly techniques are hereinafter set forth in detail.

Figure 2:
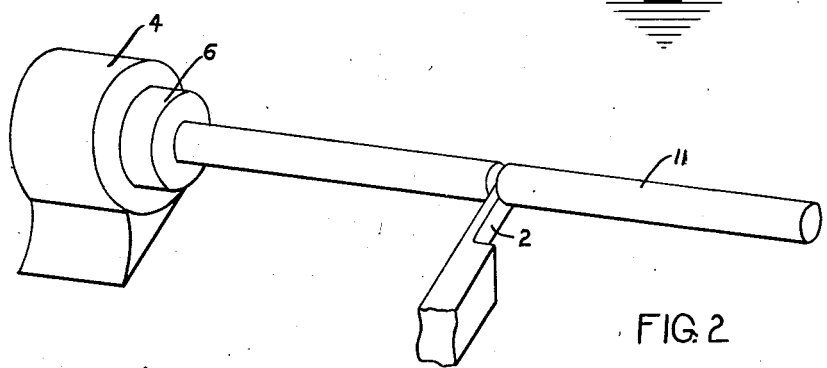
Figure 3:
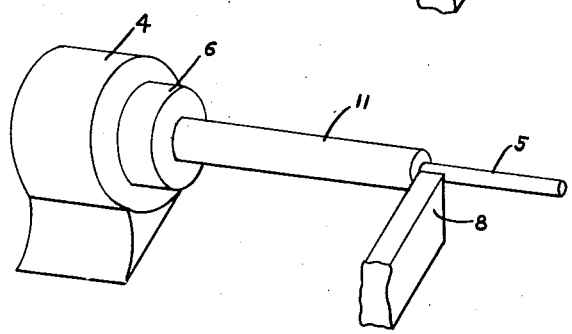
Figure 4:
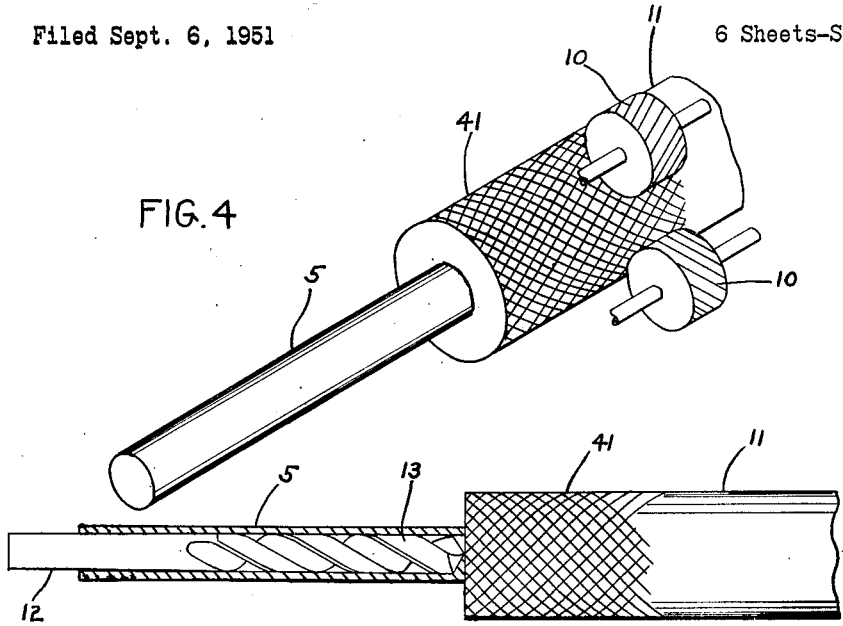
Figure 9:
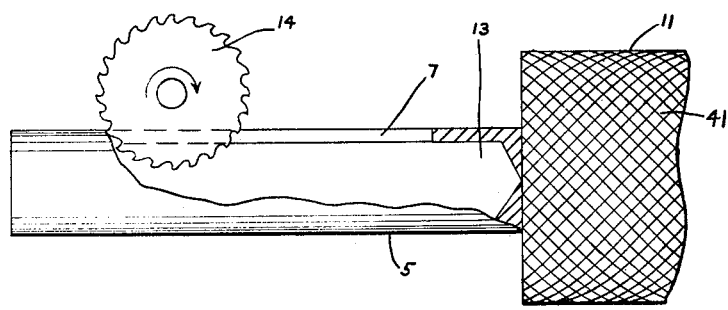
Figure 10:
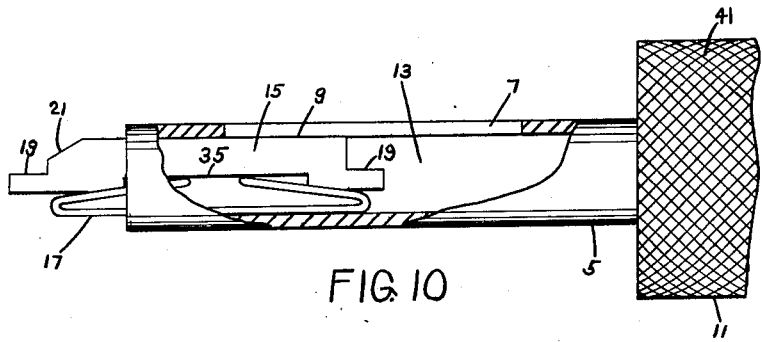
Figure 11:
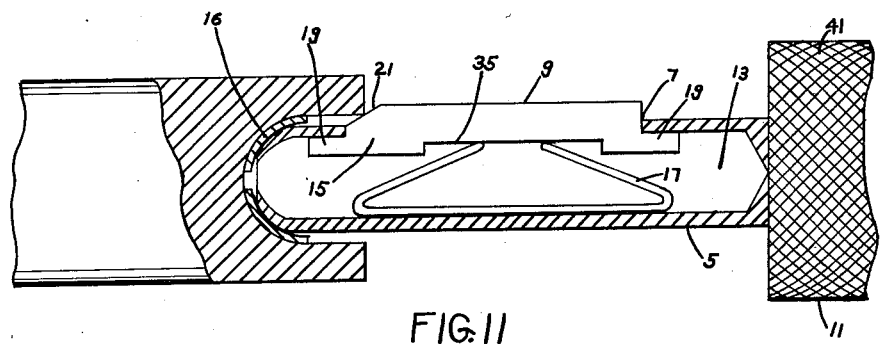
Figure 12:
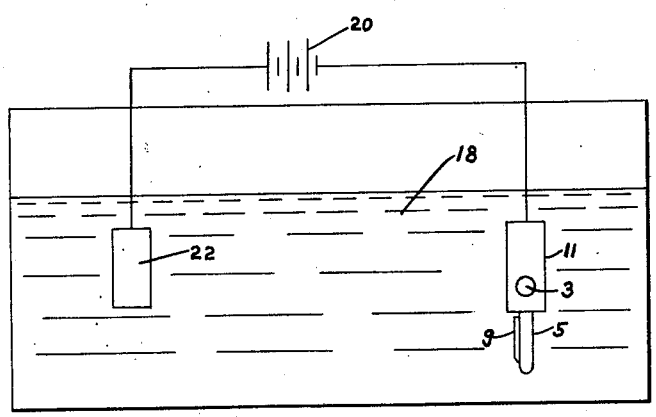
Figure 16:
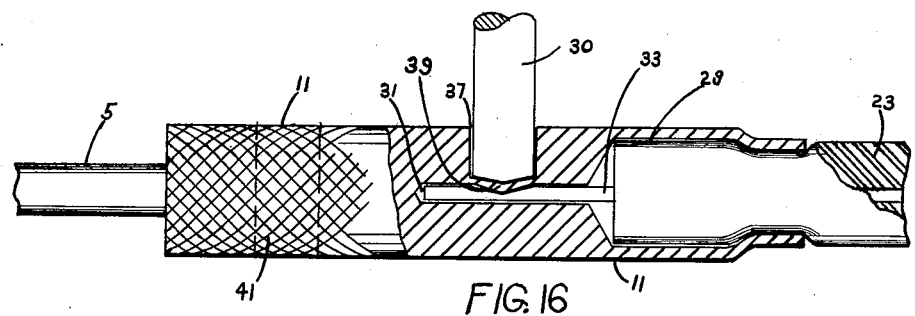
Figure 17:
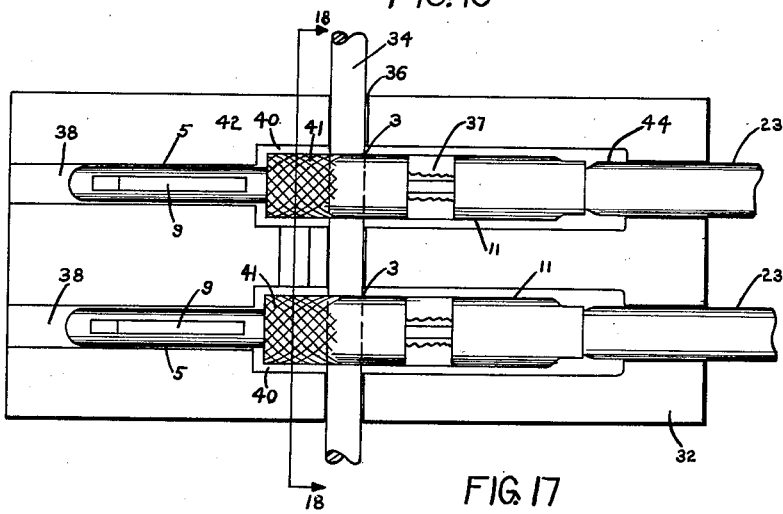
Figure 18:
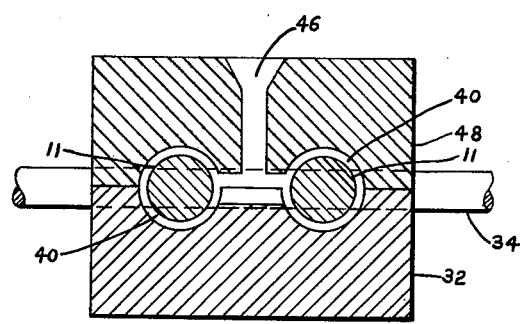
Figure 19:
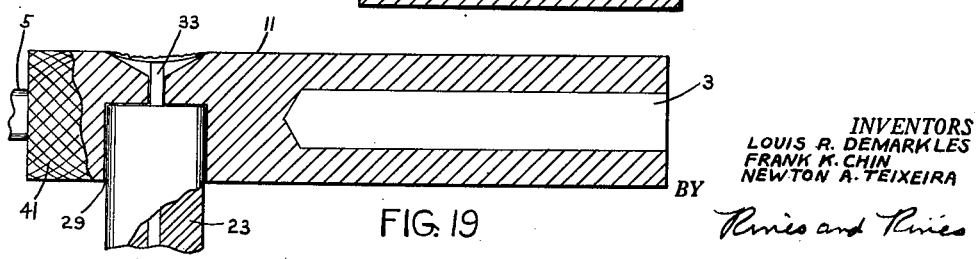

The invention will now be described in connection with the accompanying drawing, Fig. 1 of which is a diagrammatic view illustrating plugs constructed in accordance with a preferred embodiment of the present invention and utilized in an electric system; Figs. 2 and 3 are perspectives illustrating, respectively, blank cutting and turning operations; Fig. 4 is a perspective, upon a larger scale, partly cut away, illustrating a knurling operation; Figs. 5 to 8 are side elevations, partly in section, illustrating various drilling operations; Fig. 9 is a perspective, partly cut away, illustrating a milling operation; Figs. 10 and 11 are side elevations upon still a larger scale, partly in section, illustrating assembly steps; Fig. 12 is a schematic view of an electroplating step; Fig. 13 is a perspective, partly cut away, illustrating a further milling step; Fig. 14 is a similar view illustrating the preparation of a wire-lead conductor; Fig. 15 is a side elevation, partly in section, illustrating soldering and crimping steps; Fig. 16 is a similar view of a modified conductor-securing step; Fig. 17 is a plan of a pair of plugs disposed in the bottom cavity of a mold; Fig. 18 is a sectional view taken along the line 18—18 of Fig. 17, looking in the direction of the arrows, and including the upper cover of the mold; and Fig. 19 is a view of a modified plug.

Referring to Fig. 1, the electric plug is shown having an insulation-covered portion 1 provided with a transversely disposed plug-pin receiving recess 3. The plug is provided with a terminal plug pin 5 having a slot 7 in an intermediately disposed portion of the exterior surface of the plug pin 5. The insulation extends from the inner end of the plug pin 5 continuously to the insulation of an insulation-covered conductor 23 to which it is secured, and is preferably of a molded construction hereinafter described in detail. The slot 7 communicates with a hollow 13, Figs. 10 and 11, formed in the conducting plug pin 5. A contact member 9, constituting the upper knife-like edge of a conducting element 15 that is disposed in the hollow 13, extends through the slot 7. A triangular wire spring 17, also disposed within the hollow 13, yieldingly biases the element 15 and its contact member 9 outward through the slot 7 toward a limiting position of outward movement determined by the shoulders 19. The contact member 9 is preferably provided with a forward inclined portion 21 in order to assist in the depressing of the contact member 9 into the slot 7 in opposition to the biasing action of the spring 17 as the plug pin 5 is forced into a receptacle such as a conducting tubular socket 21, Fig. 1.

A pair of plug pins are shown at the top of Fig. 1, one connected at each end of the uppermost insulation-covered conductor 23, and each communicating with an upper terminal socket 21 of each of a pair of electrical devices 25, such as, for example, electrical test equipment or other circuits. The lower receptacles 21 of the devices 25 are similarly connected to similar plugs 1. The lower receptacle 21 of the left-hand device 25 is connected by plugs 1 at each end of a further conductor 23 to the left-hand terminal socket 21 of a meter 27. The meter 27 is connected in series with the lower receptacle 21 of the right-hand electrical device 25 through still a further conductor 23 having a pair of terminal plugs 1, in order to measure, for example, current flowing therebetween. A multiple electrical connection is established at the right-hand terminal socket 21 of the meter 27 by a further plug 1 the pin 5 of which is inserted within the transverse plug-pin receiving recess 3 of the plug 1 that is already disposed within the right-hand meter socket 21. This further plug 1 is then connected to a grounded socket 21 in order to ground the right-hand terminal of the meter 27. A similar multiple connection that may connect with a further meter (not shown) or any other electric circuit, is shown at the recess 3 of the plug 1 that connects to the lower receptacle 21 of the left-hand electrical device 25. Further plugs may, of course, be inserted in the exposed transverse plug-pin receiving recesses 3 of all of the plugs 1 to provide more than two connections at the same point, if desired. In actual practice, a large number of electrical connections may thus be easily effected at any desired point of an electrical circuit. Instead of connecting with terminal receptacles 21 associated with electrical equipment 25, furthermore, the plugs may connect with terminal recesses in conventional "alligator" clips, spade lugs and the like.

In accordance with a preferred embodiment of the present invention, the plug is manufactured from a single piece of conducting stock, such as cylindrical brass rod of diameter, for example, of about a quarter of an inch. This stock may be fed into an automatic screw machine or other similar apparatus that may perform several forming operations, independently illustrated in Figs. 2 to 9 as separate steps for purposes of explanation and clarity.

The body 11 of the plug may be formed by cutting off appropriate predetermined lengths of rod. A cutting tool 2 is shown in Fig. 2 cutting off such a predetermined length of the conducting stock as it is rotated with the chuck 6 of a motor 4. The body 11 may, for example, be about two and an eighth inches long. It is to be understood that the dimensions herein described have been found, in practice, to be particularly adapted for use with the present-day terminal receptacles of standard test equipment "alligator" clips, spade lugs and the like. These dimensions, however, are by way of illustration only and plugs having widely different dimensions may be manufactured in accordance with these techniques. Though the various types of tools and forming techniques illustrated, moreover, and the order of the various manufacturing steps, are preferred, equivalent devices and steps may, of course, be employed.

A forward terminal portion of the conducting body 11 is reduced in diameter, preferably to about an eighth of an inch, by a cutting tool 8, Fig. 3, to form the plug pin 5.

A portion 41 of the conducting surface 11 may be roughened, as by knurling with the aid of knurling rolls 10, Fig. 4, to provide for securing a molded insulation cover 1 to the large diameter portion of the conducting body 11, as will hereinafter be explained.

Figure 5:
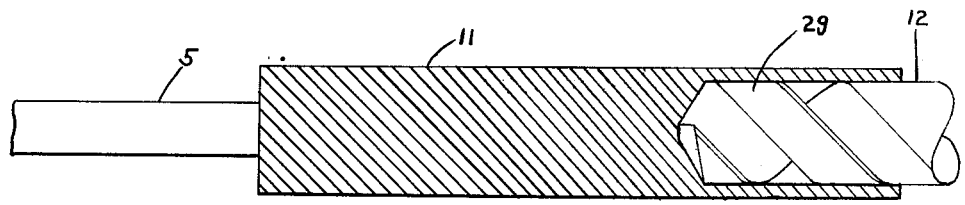
Figure 6:
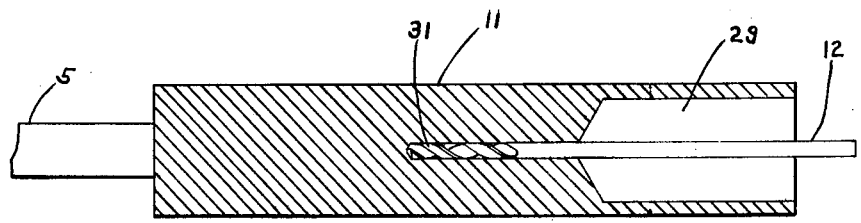

A hollow 13 is bored within the plug pin 5, preferably substantially throughout its length, as by means of a drill 12, shown in Fig. 5. A similar preferably longitudinally extending recess portion 29, Fig. 6, is drilled at the other end of the plug of diameter sufficient to accommodate the insulation covering of the insulation-covered conductor 23. For a plug of the before-mentioned dimensions, the recess 29 is preferably about a half an inch long. The recess portion 29 is extended into a second recess portion 31 of smaller diameter, Fig. 7, for the purpose of accommodating the stripped end portion 33 of the insulation-covered conductor 23, more specifically illustrated in Figs. 14, 15 and 16. The length of the smaller diameter recess portion 31 is preferably of the order of five-sixteenths of an inch.

Figure 8:
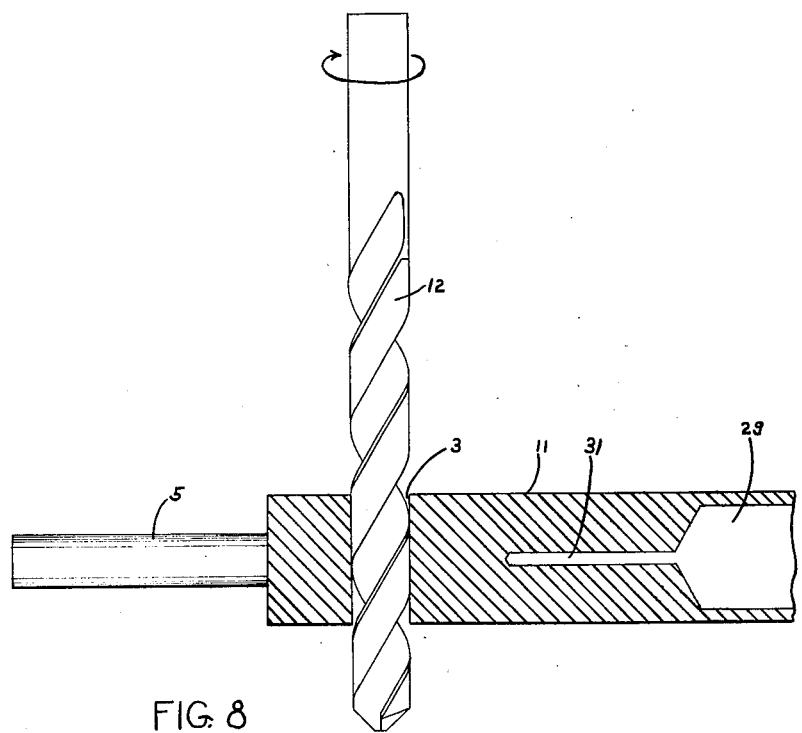

The before-mentioned transverse recess 3 is then formed, as shown in Fig. 8, at a position intermediate the inner end of the plug pin 5 and the inner end of the recess portion 31. The diameter of the transverse plug-pin receiving recess 3 is made slightly larger than the diameter of the plug pin 5 in order to receive the plug pin of a further plug for the purpose of providing multiple connections, as illussstrated in Fig. 1.

The slot 7 in the exterior surface of the plug pin 5 intermediate the ends thereof and communicating with the hollow 13 may then be formed by a milling tool 14, as shown in Fig. 9. The slot 7 may be about five-eighths of an inch in length.

The before-mentioned element 15 provided with its upper edge contact member 9 is then inserted along with the triangular spring 17, the open arms of which engage a depression 35 at the bottom of the element 15, into the hollow 13 of the plug pin 5. When the element 15 and the spring 17 are fully inserted into the hollow 13 of the plug pin 5 the contact member 9 is biased yieldingly outward through the slot 7, as shown in Fig. 11, being limited in its outward movement by the shoulders 19. It is then necessary to provide a closure for the end of the plug pin 5 which prevents the element 15 and the spring 17 from being forced out of the hollow 13 when the plug pin 5 is inserted into the receptacle 21, thereby depressing the contact member 9 within the slot 7 in opposition to the biasing action of the spring 17. Rather than provide a separate plug for the hollow 13 which not only requires an additional part but also is subject to loosening and being forced out as the spring 17 becomes compressed, it has been found preferable to close over the open end of the plug pin 5 by spinning with the aid of a spinning tool 16.

The plug is then inserted in an electroplating bath, Fig. 12, such as a conventional nickel-plating solution 18, where, in response to the potential of a battery or other source 20 connected between the plug, as a cathode, and an anode 22, it is provided with a nickel plate that improves its surface conductivity as well as the appearance of the plug.

A depression 37 is then milled, as with the aid of a cutter 24, transversely of the conducting body 11 in the vicinity of the smaller diameter recess portion 31, intersecting the recess portion 31, as illustrated in Figs. 13 and 15. The stripped end 33 of the conductor 23 that is to be connected to the plug is then preferably tinned with solder, as by a soldering iron 26, Fig. 14. As shown in Fig. 15, the stripped end 33 is then inserted within the second recess portion 31 and solder is applied in the depression 37 to bind the stripped end 33 to the conducting body 11, electrically and mechanically. It is preferable not to rely upon this solder bond for mechanical strength. In order to insure that the conductor 23 does not loosen from the plug, as when the conductor is flexed or the plug is removed from receptacles, the insulation of the conductor 23 adjacent the stripped end 33 is secured within the recess portions 29 by crimping the open end of the recess portion 29 with a crimping tool 28.

Alternately, if it is not desired to use solder, the depression 37 may be formed with a thin bottom wall 39, Fig. 16. A swedging tool 30 may then force the wall 39 outward into swedged engagement with the stripped end 33 of the conductor 23 to secure the conductor within the recess portion 31 of the conducting body 11.

The plugs are now ready for the provision of the insulation cover 1. Two plug pins connected to the ends of a conductor 23 are illustrated in Fig. 17 placed within the bottom section 32 of a mold cavity adapted to receive injection-introduced plastic material, such as polyvinyl chloride. It is desired that the insulation covering 1 completely envelop the conducting body 11 so that the operator cannot be shocked in applying or removing the plug to or from the receptacle 21. It is necessary, however, that the transverse recess 3 be kept free of plastic since it is ultimately to receive the plug pins of other plugs to provide multiple electrical connections, as before explained. In accordance with the present invention, a pin 34 is passed through the transverse recesses 3 in the pair of plugs and is seated in a groove 36 in the mold 32 to aline the plugs in the mold. As will hereinafter appear, when the plastic material is injected into the mold, the pin 34 also serves the purpose of closing off the transverse plug-pin receiving recesses 3 in order to keep plastic out of the recesses 3. The plug pins 5 extend in channels 38 of the mold cavity 32 external to the regions 40 into which the plastic is injected. In actual practice, as shown in Fig. 17, the plastic is molded over a small portion 42 at the inner end of the plug pin 5 to provide a terminal portion that locks the insulation covering over the forward end of the conducting body portion 11. A portion 44 of the insulation of the insulation-covered conductor 23 is also inserted within the plastic-receiving cavity portion 40 so that the plastic overlaps the insulation to form a good bond therewith. It is preferable that the insulation of the conductor 23 be of the same material as the plastic used for covering the plug—in this case polyvinyl chloride—to provide the best bond. The purpose of the knurled or otherwise roughened surface portion 41, previously described, may now be explained. When plastic is injected into the aperture 46, Fig. 18, in the top section 48 of the mold, it flows within the cavity region 40 of the top and bottom sections of the mold, around the conducting body portions 11 including the inner portions 42 of the plug pins 5 and the portions 44 of the insulation of the insulation-covered conductor 23. The molten plastic locks within the roughened portions 41 thus preventing the rotational or longitudinal slipping of the insulation cover 1 formed about the plug. While the knurled surface portion 41 is deemed preferable for the present purposes, slots, depressions or other roughening configurations could be utilized.

When the plastic has hardened, the top cavity portion of the mold is removed and the pin 34 is withdrawn from the transverse recesses 3. The resulting molded construction provides strength additional to that provided by the soldering and crimping steps of Fig. 15, or the swedging and crimping steps of Fig. 16, to resist any tendency for separation of the plug and the wire-lead conductor 23. Since the molded cover 1 locks upon the inner end 42 of the plug pin 5 and upon the portion 44 of the insulation of the conductor 23, sharp bends or flexing of the wire-lead conductor 23 at the point of electrical connection to the plug are virtually impossible and breaks are eliminated. As an illustration, the leads 1—23—1 of Fig. 1, thus formed, have been found to withstand tensile forces in excess of forty-five pounds. The plug is fully insulated without the possibility of exposing current-carrying surfaces, and multiple connections can be effected through the transverse recesses 3 without the danger of electrical shock.

While the transverse plug-pin receiving recess 3 has been illustrated as disposed with its axis at right angles to the longitudinal axis of the plug, which orientation has been found to be particularly well-suited for connecting with electrical apparatus in the manner shown in Fig. 1, it is to be understood that the recess may also extend transversely at an acute angle to the longitudinal axis of the plug. More than one plug-pin receiving recess may also be provided. It may be desired, furthermore, for some applications, to orient the recess 3 substantially parallel to the longitudinal axis of the plug, which is transverse to the cross section of the plug. Such an arrangement is illustrated in Fig. 19, where the positions of the connection of the lead conductor 23 and the recess 3 are substantially interchanged. The insulation-molding technique will then, of course, be correspondingly modified.

Further modifications will occur to those skilled in the art and all such are considered to fall within the spirit and scope of the present invention as defined in the appended claims.

What is claimed is:

1. An electric plug having a longitudinally extending insulation-covered conducting body portion provided with a transversely disposed plug-pin-receiving recess extending completely through the conducting body and the insulation covering and, beyond the insulation covering, with a longitudinally extending terminal conducting hollow plug pin the hollow of which communicates through a slot with an intermediately disposed portion of the exterior surface of the plug pin, an element movably confined in the hollow of the plug pin provided with a contact member extending through the slot, and means disposed in the said hollow engaging the element to bias the contact member yieldingly outward toward a limiting position of outward movement.

2. An electric plug having an insulation-covered longitudinally extending cylindrical conducting body portion provided with a transversely disposed cylindrical plug-pin-receiving recess extending completely through the conducting body and the insulation covering and, beyond the insulation covering, with a longitudinally extending terminal conducting cylindrical hollow plug pin of reduced diameter the hollow of which communicates through a slot with an intermediately disposed portion of the exterior surface of the plug pin, an element movably confined in the hollow of the plug pin provided with a contact member extending through the slot, and means disposed in the said hollow engaging the element to bias the contact member yieldingly outward toward a limiting position of outward movement.

3. An electric plug having a longitudinally extending conducting body comprising a cylindrical terminal plug pin connected to one end of an axially aligned cylindrical extension of greater diameter, the plug pin being hollow and having a longitudinally extending slot disposed intermediate its exterior surface communicating with the hollow of the plug pin, an element movably confined in the said hollow provided with a contact member extending through the slot, means disposed within the said hollow engaging the element to bias the contact member yieldingly outward toward a limiting position of outward movement, an insulation-covered conductor connected to the other end of the cylindrical extension, and a one-piece insulating plastic cylinder concentric with the cylindrical extension and molded to the same, the plastic cylinder terminating in a molded terminal junction with the said insulation-covered conductor and in a terminal portion molded over the said one end of the cylindrical extension and to and upon an adjacent portion of the plug pin.

4. An electric plug having a longitudinally extending conducting body portion provided at one end with a longitudinally extending conducting hollow plug pin the hollow of which communicates through a slot with an intermediately disposed portion of the exterior surface of the plug pin, and at the other end with a recess for receiving a stripped end of an insulation-covered conductor and an adjacent portion of the insulation cover, an element movably confined in the hollow of the plug pin provided with a contact member extending through the slot, means disposed in the said hollow engaging the element to bias the contact member yieldingly outward toward a limiting position of outward movement, means for securing the stripped end of the said insulation-covered conductor and the said adjacent portion of the insulation cover within the said recess, and a further insulation covering for the conducting body extending from the insulation of the insulation-covered conductor at the said other end of the conducting body to the plug pin, the insulation-covered conducting body portion being provided with a transversely disposed plug-pin-receiving recess.

5. An electric plug having a longitudinally extending conducting body portion provided at one end with a longitudinally extending conducting hollow plug pin the hollow of which communicates through a slot with an intermediately disposed portion of the exterior surface of the plug pin, and at the other end with a recess having first and second portions of different cross section, the second portion having a cross section sufficient to receive the stripped end of an insulation-covered conductor and the first portion having a larger cross section for receiving the adjacent portion of the insulation cover, an element movably confined in the hollow of the plug pin provided with a contact member extending through the slot, means disposed in the said hollow engaging the element to bias the contact member yieldingly outward toward a limiting position of outward movement, means for electrically and mechanically securing the stripped end of the said insulation-covered conductor within the second recess portion, means for securing the said adjacent portion of the insulation cover within the first recess portion, and a molded plastic insulation covering for the conducing body molded to and extending from the insulation of the insulation-covered conductor at the said other end of the conducting body to the plug pin.

6. An electric plug having a longitudinally extending conducting body portion provided at one end with a longitudinally extending conducting hollow plug pin the hollow of which communicates through a slot with an intermediately disposed portion of the exterior surface of the plug pin, and at the other end with a recess having first and second portions of different cross section, the second portion having a cross section sufficient to receive the stripped end of an insulation-covered conductor and the first portion having a larger cross section for receiving the adjacent portion of the insulation cover, an element movably confined in the hollow of the plug pin provided with a contact member extending through the slot, means disposed in the said hollow engaging the element to bias the contact member yieldingly outward toward a limiting position of outward movement, means for electrically and mechanically securing the stripped end of the said insulation-covered conductor within the second recess portion, means for securing the said adjacent portion of the insulation cover within the first recess portion, and a molded plastic insulation covering for the conducting body molded to and extending from the insulation of the insulation-covered conductor at the said other end of the conducting body to the plug pin, the molded plastic insulation-covered conducting body portion being provided with a transversely disposed plug-pin-receiving recess.

7. An electric plug having a longitudinally extending cylindrical conducting body portion provided at one end with a longitudinally extending conducting cylindrical hollow plug pin of reduced diameter the hollow of which communicates through a slot with an intermediately disposed portion of the exterior surface of the plug pin, and at the other end with a longitudinally extending cylindrical recess having first and second portions of different diameter, an element movably confined in the hollow of the plug pin provided with a contact member extending through the slot, means disposed in the said hollow engaging the element to bias the contact member yieldingly outward toward a limiting position of outward movement, an insulation-covered conductor provided with a stripped end, the said second portion of the longitudinally extending conducting body recess having a diameter sufficient to receive the stripped end of the conductor and the first portion having a larger diameter for receiving the adjacent portion of the insulation cover of the conductor, means for electrically and mechanically securing the stripped end of the said conductor within the second recess portion, a crimp at the said other end of the conducting body for securing the said adjacent portion of the insulation cover within the first recess portion, and a molded plastic insulation covering for the conducting body molded to and extending from the insulation of the insulation-covered conductor at the said other end of the conducting body to the plug pin, the molded plastic insulation-covered conducting body being provided with a transversely disposed cylindrical plug-pin-receiving recess at a region between the plug pin and the said longitudinally extending recess.

8. An electric plug having a longitudinally extending cylindrical conducting body portion provided at one end with a longitudinally extending conducting cylindrical hollow plug pin of reduced diameter the hollow of which communicates through a slot with an intermediately disposed portion of the exterior surface of the plug pin, and at the other end with a longitudinally extending cylindrical recess having first and second portions of different diameter, an element movably confined in the hollow of the plug pin provided with a contact member extending through the slot, means disposed in the said hollow engaging the element to bias the contact member yieldingly outward toward a limiting position of outward movement, an insulation-covered conductor provided with a stripped end, the said second portion of the longitudinally extending conducting body recess having a diameter sufficient to receive the stripped end of the conductor and the first portion having a larger diameter for receiving the adjacent portion of the insulation cover of the conductor, means comprising a solder-receiving recess communicating from the exterior surface of the conducting body portion with the said second recess portion for enabling the electrical and mechanical securing of the stripped end of the said conductor withing the second recess portion, and a molded plastic insulation covering for the conducting body molded to and extending from the insulation of the insulation-covered conductor at the said other end of the conducting body to the plug pin, the molded plastic insulation-covered conducting body having means for preventing the loosening of the molded plastic cover from the conducting body and being provided with a transversely disposed cylindrical plug-pin-receiving recess at a region between the plug pin and the said longitudinally extending recess.

9. An electric connector having, in combination, an insulation-covered conductor stripped at each end and joined thereat to an electric plug having a longitudinally extending cylindrical conducting body portion provided at one end with a longitudinally extending conducting cylindrical hollow plug pin of reduced diameter the hollow of which communicates through a slot with an intermediately disposed portion of the exterior surface of the plug pin, and at the other end with a longitudinally extending cylindrical recess having first and second portions of different diameter, an element movably confined in the hollow of the plug pin provided with a contact member extending through the slot, means disposed in the said hollow engaging the element to bias the contact member yieldingly outward toward a limiting position of outward movement, the said second portion of the longitudinally extending conducting body recess having a diameter sufficient to receive the stripped end of the conductor and the first portion having a larger diameter for receiving the adjacent portion of the insulation cover of the conductor, means for electrically and mechanically securing the stripped end of the said conductor within the second recess portion, and a molded plastic insulation covering for the conducting body molded to and extending from the insulation of the insulation-covered conductor at the said other end of the conducting body to the plug pin, the molded plastic insulation-covered conducting body being provided with a transversely disposed cylindrical plug-pin-receiving recess at a region between the plug pin and the said longitudinally extending recess.

10. An electric plug having a longitudinally extending insulation-covered conducting body portion provided with a plug-pin-receiving recess extending through the insulation covering into the conducting body portion and, beyond the insulation covering with a longitudinally extending terminal conducting hollow plug the hollow of which communicates through a slot with an intermediately disposed portion of the exterior surface of the plug pin, an element movably confined in the hollow of the plug pin provided with a contact member extending through the slot, and means disposed in the said hollow engaging the element to bias the contact member yieldingly outward toward a limiting position of outward movement.

11. An electric plug having a longitudinally extending insulation-covered conducting body portion provided with a longitudinally disposed plug-pin-receiving recess extending through the insulation covering into the conducting body portion and, beyond the insulation covering with a longitudinally extending terminal conducting hollow plug the hollow of which communicates through a slot with an intermediately disposed portion of the exterior surface of the plug pin, an element movably confined in the hollow of the plug pin provided with a contact member extending through the slot, and means disposed in the said hollow engaging the element to bias the contact member yieldingly outward toward a limiting position of outward movement.

12. An electric plug having a longitudinally extending conducting body comprising a cylindrical terminal plug pin connected to one end of an axially aligned cylindrical extension of greater diameter, the plug pin being hollow and having a longitudinally extending slot disposed intermediate its exterior surface communicating with the hollow of the plug pin, an element movably confined in the said hollow provided with a contact member extending through the slot, means disposed within the said hollow engaging the element to bias the contact member yieldingly outward toward a limiting position of outward movement, an insulation-covered conductor connected to the other end of the cylindrical extension, a one-piece insulating plastic cylinder concentric with the cylindrical extension and molded to the same, the plastic cylinder terminating in a molded terminal junction with the said insulation-covered conductor and in a terminal portion molded over the said one end of the cylindrical extension and to and upon an adjacent portion of the plug pin, a plug-pin-receiving recess extending transversely through the cylindrical extension, and apertures in the plastic cylinder alined with the plug-pin-receiving recess to permit a plug pin to be received therein in electrical contact with the plug, thereby to establish multiple electrical connection with the plug.

13. An electric plug having a longitudinally extending conducting body comprising a terminal plug portion connected to one end of an axially aligned cylindrical extension of greater cross section, the terminal portion having resilient means biased yieldingly outward, an insulation-covered conductor connected to the other end of the cylindrical extension, an insulating plastic cylinder concentric with the cylindrical extension and covering the same, the plastic cylinder terminating at one end at insulation of the said insulation-covered conductor and at the other end at the said one end of the cylindrical extension adjacent the terminal plug portion, a terminal-plug-portion-receiving recess extending transversely through the cylindrical extension, and apertures in the plastic cylinder aligned with the terminal-plug-portion-receiving recess to permit a terminal plug portion to be received therein in electrical contact with the plug, thereby to establish multiple electrical connection with the plug.

14. An electric plug having a longitudinally extending conducting body comprising a terminal plug portion connected to one end of an axially aligned cylindrical extension of greater cross section, the terminal portion having resilient means biased yieldingly outward, an insulation-covered conductor connected to an intermediate region of the cylindrical extension, an insulating plastic covering for the cylindrical extension including the said intermediate region, the cylindrical extension being provided at its other end with a longitudinally extending terminal-plug-portion-receiving recess, and the plastic covering having an aperture aligned with the terminal-plug-portion-receiving recess to permit a terminal plug portion to be received therein in electrical contact with the plug, thereby to establish multiple electrical connection with the plug.

References Cited in the file of this patent

UNITED STATES PATENTS

| | | |
|---|---|---|
| 1,864,989 | Maag-Eckenfelder | June 28, 1932 |
| 2,076,072 | Douglas | Apr. 6, 1937 |
| 2,289,512 | McKenney et al. | July 14, 1942 |
| 2,297,785 | Lake | Oct. 6, 1942 |
| 2,299,617 | Eisenberg | Oct. 20, 1942 |
| 2,343,664 | Heiser | Mar. 7, 1944 |
| 2,396,872 | Miller et al. | Mar. 19, 1946 |
| 2,401,451 | Arey | June 4, 1946 |
| 2,444,997 | Lovesey | July 13, 1948 |
| 2,570,800 | Hamm | Oct. 9, 1951 |
| 2,690,546 | Ostrak | Sept. 28, 1954 |

FOREIGN PATENTS

| | | |
|---|---|---|
| 220,574 | Switzerland | Feb. 16, 1943 |
| 245,186 | Switzerland | July 1, 1947 |
| 379,115 | Germany | Aug. 14, 1923 |
| 417,805 | Great Britain | Oct. 12, 1934 |
| 461,783 | Great Britain | Feb. 24, 1937 |
| 465,579 | Germany | Sept. 21, 1928 |
| 536,665 | Great Britain | May 22, 1941 |
| 519,739 | Great Britain | Mar. 14, 1949 |
| 630,847 | Germany | June 6, 1936 |